Oct. 11, 1966    G. CRANSKENS    3,277,807
PLANAR EXPOSURE DEVICES
Filed May 7, 1964    2 Sheets-Sheet 1

Inventor:
GEORG CRANSKENS
AGENT

Oct. 11, 1966  G. CRANSKENS  3,277,807
PLANAR EXPOSURE DEVICES
Filed May 7, 1964  2 Sheets-Sheet 2
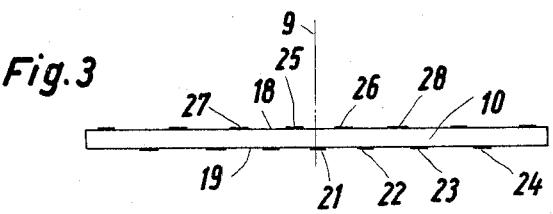
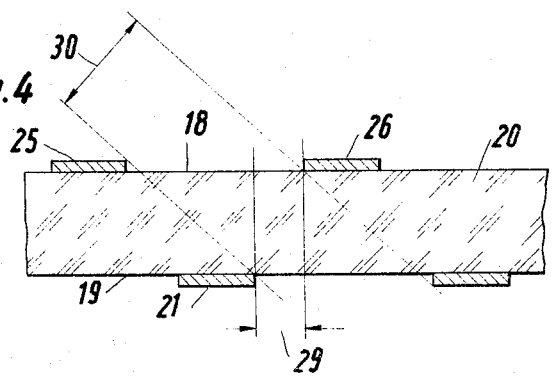
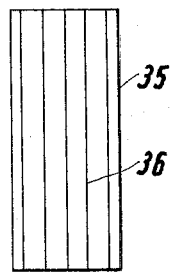
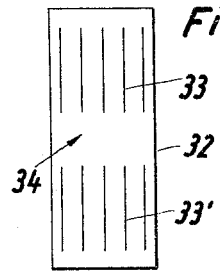
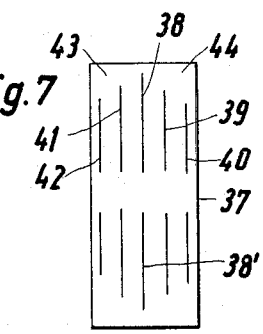
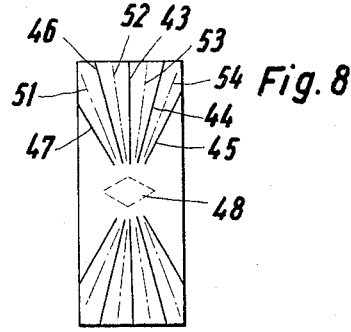
Inventor:
GEORG CRANSKENS
AGENT United States Patent Office 3,277,807
Patented Oct. 11, 1966

3,277,807
PLANAR EXPOSURE DEVICES
Georg Cranskens, Wedel, Holstein, Germany, assignor to Lumoprint Zindler K.G., Hamburg, Germany
Filed May 7, 1964, Ser. No. 365,734
Claims priority, application Germany, May 16, 1963, L 44,888
18 Claims. (Cl. 95—73)

The invention relates to a planar exposure device with a flat lay base. The invention provides an arrangement with only one light source or with a rectilinear centre arrangement of light sources, arranged in front of the center zone of the lay base, and comprising a shutter between the light source or light source arrangement and the said lay base.

Preferably, the arrangement according to the invention comprises a substantially V-shaped housing for the exposure device, the end walls of which extend substantially perpendicularly to the law base, and wherein the section of the housing remote from the lay base contains an oblong, rectilinear arrangement of light sources.

From the point of view of the construction of a so-called photo-copier, these exposure devices have considerable advantages, because the housing for the planar exposure device need no longer be of cubic construction, and the inwardly tapering side walls make available a space overlapping at least partially the extent of the lay base, and suitable for housing a developing tank or the like. In addition, the whole installation may be made much cheaper.

Planar exposure devices present a special problem in the uniform illumination of the whole lay base. Hitherto, this problem has been usually tackled by arranging a plurality of lamps in one plane, possibly having different outputs according to their location in relation to the surface to be illuminated, or by using special lamps; these solutions were extremely complex and expensive. This problem is usually solved by providing a strip-shaped or oblong shutter for equalizing the illumination of the lay base. This shutter for preventing direct light incidence results in an arrangement which is generally sufficient, but which may still be improved where the exposure device is to be used for specifically high requirements, such as may be present with weak originals or the like.

The present invention has the object of providing such an improvement, and more particularly, of providing with simple means an exposure device with a point-shaped, or in another embodiment with an oblong light source arrangement and walls which are oblique relative to a lay base, permitting the practically completely uniform illumination by the lay base, without thereby incurring any additional electrical expenditure or wasting space.

It is a further object of the invention to provide a novel planar exposure device which may be easily manufactured and is economical in operation.

It is yet another object of the invention to provide a planar exposure device equipped with a novel shutter arrangement.

It is a further object of the invention to provide a planar exposure device which may be manufactured easily and economically and which may be combined easily and compactly with another copying unit, such as a developer.

It must here be stated that known shutters are based on providing a planar element which inhibits the passage of light rays.

According to the invention, the object is realised in that the shutter in a planar exposure device comprises several planes with planar shutter elements, located parallel to the lay base, and offset relative to one another in the different planes. Thus, the shutter does not consist of a planar element, but of an arrangement which, due to its distribution into several planes, permits the passage of light whilst preventing the incidence of direct radiation, especially in the centre portion of the lay base.

The shutter elements are conveniently offset relative to one another in that manner that the incidence of direct radiation on the centre portion of the lay base is inhibited whilst oblique rays are allowed to pass. This oblique passage of rays may relate to rays passing directly from the light source arrangement to the edge zones of the lay base, or to reflected radiation which may to some extent be incident on the centre zone of the lay base.

In a preferred embodiment, the shutter elements are arranged in two planes.

In a preferred embodiment of the invention, the gaps between the shutter elements become larger from a line or plane normal to the lay base to the light source or light source assembly with increasing distance from this line or plane. This arrangement yields particularly favourable conditions.

In yet another preferred embodiment, especially with a substantially V-shaped oblong housing, the shutter arrangement comprises shutter elements which are oriented parallel to the direction of the row of light sources and of which at least one element is in the perpendicular centre plane relative to the lay base.

Conveniently, one such shutter element located in the shutter plane adjacent light source assembly is arranged in the perpendicular centre plane relative to the lay base.

The particularly planar shutter element have preferably the shape of strips and may be arranged parallel to the direction of the row of light sources. However, the invention also relates to circular or rectangular shutter sections which are offset relative to one another relative to the said parallel planes and may be arranged in staggered relationship with increasing gaps towards the outside.

In another embodiment, sector-shaped shutter elements are provided and these have conveniently an additional planar element in the centre. This is omitted in a particularly preferred embodiment with a row of light sources recessed in the centre.

A substantial feature from the point of view of the uniform design of the shutter is that a common carrier of transparent material is provided for the shutter elements arranged in adjacent planes.

The invention will be further described, by way of example, with reference to the accompanying drawings, in which:

FIG. 3 is an enlarged drawing of the shutter of the device of FIG. 1 in front elevation without retaining clamps;

FIG. 4 shows a portion of the arrangement of FIG. 3 in cross-section on a yet more enlarged scale;

FIGS. 5, 6, 7 and 8 are top views of different kinds of shutter arrangements shown diagrammatically.

Figure 1:
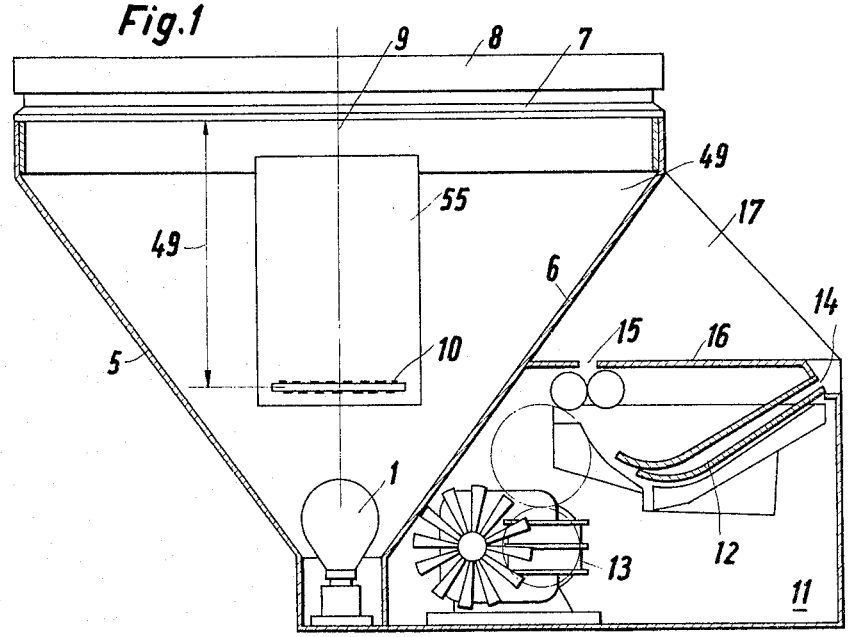
FIG. 1 is a diagrammatical cross-section of a planar exposure device according to the invention.
Figure 2:
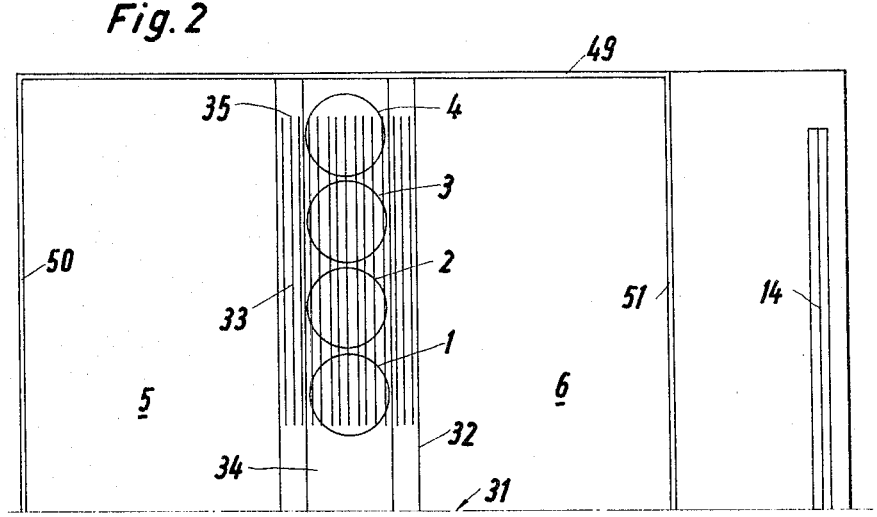
FIG. 2 is a top view of the device of FIG. 1 with the lay base or with the contact cover removed.

FIG. 1 explains the invention with reference to a particularly advantageous construction as photo copier. The exposure device has a rectilinear arrangement of several lamps 1 to 4 arranged side by side and located substantially in the apex of a housing with V-shaped cross-section and with oblique side walls 5, 6 divering towards the top. In conjunction with ends walls, extending parallel to the plane of the drawing, and one of which may be seen at 49 in FIG. 2, these side walls support on the top a flat and transparent lay base 7; a contacts cover 8 is movably, for example by means of hinges, or detachably mounted on this lay base 7. FIG. 2 shows also the upper edges 50, 51 of vertical portions of the generally oblique side walls 5 and 6. In the range of the imaginary centre plane 9 extending perpendicularly relative to the lay base 7 and towards the rectilinear arrangement of light sources, there is arranged a shutter 10 extending parallel to the lay base 7. The lay base may be made of glass, for example. The shutter 10 may be retained at its end faces by supporting members 55 mounted on the end walls of the housing.

The contact cover, not shown in FIG. 2, has at its lower end a preferably slightly resilient contact plate; alternatively, it may have a rigid contact plate which may be resiliently mounted in the cover.

Under the side wall 6, extending slantingly and outwardly in an upward direction, there is a chamber 11, containing a developer 12 and electrical driving and connecting means 13. Access to the developer 12 is provided at 14 at the front edge of the housing chamber, whilst the delivery orifice 15 is arranged below the sloping wall 6 in a cover wall 16. The end walls 49 of the chamber, extending parallel to the plane of the drawing, are combined to a wall section 17, connecting the front edge of the lay base 7 and the top front corners of the chamber.

The shutter, shown generally at 10, will now be explained in greater detail with reference to FIGURES 3 and 4. The two planes combined in this shutter are formed by the outer surfaces 18, 19 of a transparent carrier member 20, preferably a glass plate. These outsides carry in this case strip-shaped, planar shutter elements, extending perpendicularly to the plane of the drawing as shown in FIG. 1; one such element is shown, by way of example, at 21 in FIG. 3.

FIG. 3 also indicates a particularly advantageous combination, in which the shutter element shown at 21, located in the plane nearest the lamp 1, is arranged in the perpendicular centre plane 9. This element prevents therefore substantially the direct incidence of light on the centre region of the lay base 7. The shutter elements 22, 23, 24 on either side of this centre plane 9 are so arranged that the gaps between the elements increase towards the outside. The shutter elements 25, 26 in the plane formed by the side 18 of the shutter arrangement 27, 28, etc. are substantially of conformous configuration, that is to say, they have the same surface extensions as the shutter elements 21 through 24, but they are offset relative to these, that is to say, the shutter elements 25, 26 are located on either side of the perpendicular projection of the shutter element 21 on the lay base. In this construction, it is also possible to arrange a certain amount of overlapping in the centre region.

However, as may be seen from FIG. 3, the shutter elements 25, 26 are each offset by an amount 29 relative to the said projection, allowing a metered passage of direct light the rays of which diverge from the light source. Conveniently, the gap 29 has about half the width of the shutter elements 21, 25, 26.

These dimensions are important especially for the shutter elements adjacent the centre. FIG. 3 shows that the shutter elements 22, 23, 24 are substantially adjacent the vertical projections of the outer edges of the shutter elements 26, 28 so that the interspaces between these shutter elements are covered at least partially by the shutter elements 22, 23. Conveniently, the arrangement is such that the shutter elements 22, 23 include the centre region of a sector starting at the centre of the associated light source, whilst its legs are defined by the facing edges of the shutter elements, for example, 26 and 28.

This arrangement results in the formation of a passage in the centre region, having the width 30, and serving for the reflected radiation, the width of this strip being one and one half times that of the shutter elements 26.

FIG. 2 indicates a particularly convenient embodiment in which the rectilinear arrangement of lamps 1 to 4 starts at a distance from the centre line 31 and the shutter arrangement with its continuous transparent carrier 32 carries shutter elements 33 only above the row of light sources. The centre region at 34 is left free and is not provided either with a light source or with shutter elements. It should be pointed out that FIGURE 1 is a centre section so that a corresponding arrangement of light sources is arranged below the centre line 31 in FIG. 2, starting at the same distance as that of the lamp 1 from this centre line 31.

Obviously, the rows of lamps can also be replaced by one or two tubular or strip lamps. One such strip lamp corresponds to a continuous row of light sources, as mentioned in conjunction with a shutter according to FIG. 5, and consisting of a continuous strip lamp or a continuous row of individual lamps.

FIG. 2 also shows a further preferred feature in that the ends 35 of the shutter elements 33 terminate at a distance from the end face 36 so that the outermost light source 4 is partially unobscured.

This general arrangement of the shutter is shown diagrammatically in FIG. 6, using the same reference numeral to indicate identical parts, and showing the other groups of shutter elements at 33'.

In the case of a continuous light source, an olbong shutter 35 with continuous shutter elements 36 is used, as shown in FIGURE 5. This arrangement takes preferably into consideration the conditions explained with reference to FIGURES 3 and 4, as well as other special features at the ends, relating to shortening the shutter elements, such as are described with reference to other embodiments.

FIG. 7 shows a shutter 37, based on the same principle as that of FIG. 6. However, in this case, the strip-shaped shutter elements are so stepped on their outer ends that the centre shutter elements 38, 38' reach to near the ends of the shutter whilst the outer elements on either side, 39, 40, and 41, 42, respectively, form with their outer ends increasingly larger gaps with the ends of the shutter 37. This configuration results in corners 43, 44 which are substantially unobscured by shutter elements and serve to ensure the good exposure of the corners of the lay base.

FIG. 8 shows, by way of example, a shutter for a light source arrangement with centre gap. The shutter elements 43, 44, 45, 46, 47 of one section are sectorially arranged so that the flow of light to the outer corners and edges of the lay base is facilitated. With a continuous light source, a shutter element 48 may also be arranged in the centre region.

Regarding the arrangements of FIGURES 5, 6, 7 and 8 it should be stated that these are merely diagrammatical drawings, and that the shutters themselves have, as stated above, at least two planes, carrying each substantially conformous, mutually offset shutter elements. These shutter elements extend always in planar configuration in the plane of the shutter arrangement. The shutter elements are opaque portions, whilst their carrier, extending between these shutter elements, is transparent. However, these shutter elements may also have the form of, for example, sheet metal strips such as shown more particularly in FIG. 5, and these strips may be supported and retained at their ends.

The construction, mentioned above, comprising shutter elements in two planes carrying substantially identical but mutually offset shutter elements, may also be seen in FIG. 8 in which there are shown, between the lines 43 to 47, representing shutter strips, further shutter strips located in the other plane, not shown. These shutter strips in the other plane are indicated at 51, 52, 53, 54 and are shown in dash-dot outlines. Naturally, the shutter strips may become wider towards their outer ends or may increase with uniform width towards the outside, the latter being regarded as essential.

The width of the shutter strips depends substantially on the local conditions, namely on the distance 49 (FIG. 1) between the shutter 10 and the lay base 7. For example, in a preferred embodiment, this distance will be 45 times larger than the width of one shutter strip 26 (FIG. 4). In this connection it should also be mentioned that the distance between the shutter and the light source 1 is preferably about half as large as the distance between the shutter and the lay base 7. The width of the shutter 10 depends substantially on its arrangement relative to the distances from the light source and from the lay base, respectively.

Having thus fully disclosed my invention, what I claim and desire to secure by Letters Patent is:

1. A planar exposure device with a housing, one side wall of which forms a flat lay base which is transparent and serves as lay base for copying material and one original, comprising light source means within the said housing, in spaced relationship from the said lay base and arranged centrally relative to this lay base, wherein the imaginary projection of these light sources perpendicularly to the lay base intersects the same in its centre region, and comprising a shutter arrangement between the said light source means and the said lay base, said shutter arrangement having planar shutter elements arranged in a first and in a second plane, said planes being arranged at different distances from the lay base, wherein the shutter elements in the said different planes are offset relative to one another.

2. A planar exposure device as claimed in claim 1, wherein the light source means comprises a single centrally arranged light source.

3. A planar exposure device as claimed in claim 1, wherein the light source means consists of an oblong light source arrangement, arranged in a perpendicular centre plane relative to the said lay base.

4. A planar exposure device as claimed in claim 1, wherein the shutter elements are circular shutter sections.

5. A planar exposure device as claimed in claim 1, wherein the shutter elements are sector-shaped and opaque planar sections.

6. A planar exposure device as claimed in claim 1, wherein the planar opaque shutter elements are rectangular configurations.

7. A planar exposure device as claimed in claim 1, wherein the shutter arrangement has two parallel planes equipped with shutter elements.

8. A planar exposure device as claimed in claim 7, wherein the shutter elements in the two planes are so offset relative to each other and so arranged that the direct incidence of light on to the centre region of the lay base is substantially inhibited, whilst the light rays may pass through the shutter arrangement obliquely to the lay base.

9. A planar exposure device as claimed in claim 8, wherein the distances between shutter elements in one plane of the shutter arrangement from an imaginary line or plane normal to the lay base and passing through the light source means increase with increasing distance from the said imaginary line or plane.

10. A planar exposure device as claimed in claim 7, wherein the shutter arrangement has a carrier of a transparent material, the shutter elements being arranged on both sides in adjacently parallel planes.

11. A planar exposure device as claimed in claim 10, wherein the said carrier is a glass plate.

12. A planar exposure device, wherein the housing has a substantially V-shaped cross-section and the end walls of the housing extend substantially perpendicularly to the lay base, whilst the side walls converge with increasing distance from the lay base, wherein the housing forms a long section with V-shaped cross-section in spaced relationship to the lay base and extending over the length of the lay base, and wherein an oblong rectilinear arrangement of light sources is arranged in this section, and the shutter arrangement is equipped with shutter elements of strip-like configuration of which at least one element in one plane of the shutter arrangement is located in the perpendicular centre plane relative to the lay base which perpendicular centre plane intersects the light source arrangement.

13. A planar exposure device as claimed in claim 12, wherein the rectilinear light source arrangement is interrupted in the centre and the long shutter elements are arranged in the region above the sections of the light source arrangement on either side of this interruption.

14. A planar exposure device as claimed in claim 12, wherein the ends of the shutter elements facing the rigid sides of the housing terminate at a distance from these end faces.

15. A planar exposure device as claimed in claim 14, wherein the construction of the shutter elements shortened at their ends is provided only for the outer shutter elements arranged at a larger distance from the imaginary perpendicular centre plane on the laybase, an increasing shortening being effected with increasing distance.

16. A planar exposure device as claimed in claim 12, wherein the shutter elements are formed by strip-shaped sections extending parallel to the extent of the light source arrangement.

17. A planar exposure device as claimed in claim 16, wherein the shutter strips next to the centre of the shutter in the plane of the shutter arrangement facing the lay base are spaced from the vertical projection of a centre shutter element, located in the other plane of the shutter arrangement, by an amount corresponding substantially to two thirds of the width of one shutter strip.

18. A planar exposure device as claimed in claim 17, in which the mutually offset relationship between the shutter elements in the two planes of the shutter arrangement is such that the shutter strips located in the plane of the shutter arrangement facing the row of light sources are arranged substantially in the centre of a sector starting from the centre of the row of light sources and the legs of which are defined by the facing edges of shutter strips located in the plane of the shutter arrangement facing the lay base.

No references cited.

JULIA E. COINER, *Primary Examiner.*